UNITED STATES PATENT OFFICE 2,602,090

PROCESS FOR THE PURIFICATION OF PHENOXY-ALIPHATIC-MONOCARBOXYLIC ACIDS

Robert C. Dosser and Amerst E. Colby, Midland, Mich., assignors to The Dow Chemical Company, Midland, Mich., a corporation of Delaware No Drawing. Application July 5, 1951, Serial No. 235,396

9 Claims. (Cl. 260—521)

The present invention is concerned with the phenoxy-aliphatic-monocarboxylic acids of the formula

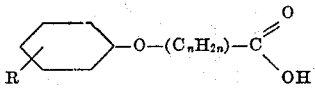

wherein $n$ is an integer and R represents bromine, chlorine, alkyl, aryl or hydrogen, and is particularly directed to an improved method for the purification of these compounds.

It is well known that the phenoxy-aliphatic-monocarboxylic acids of the above formula may be prepared by the reaction of the alkali metal salts of the chloro-aliphatic acids with the alkali metal salts of phenol or a suitable substituted phenol. Although this method permits of the economical formation of the technical grades of the acids, subsequent purification of the products in a form which is substantially free of undesirable odor and color has proven most difficult from the standpoint of economy.

The technical grade products as obtained from the practice of the above described process are crystalline solids characterized by obnoxious phenolic odors and brown, pink and gray coloration. The purification of these materials has previously been accomplished through the medium of successive recrystallizations from various organic solvents. Oftentimes such crystallizations have been coupled with other means of purification, e. g. treatment with an absorptive agent such as an activated charcoal or silica gel, in order to obtain products which are satisfactory from the standpoint of odor and color. Other methods of purification such as fractional distillation under reduced pressure are troublesome and costly at best and particularly difficult due to the tendency of the acid compounds to decompose at elevated temperatures.

It is an object of the present invention to provide an improved method for purification of technical phenoxy-aliphatic-monocarboxylic acids. A further object is to provide an improved method for the manufacture of the phenoxy-aliphatic-monocarboxylic acids of improved odor and color characteristics. Other objects will become apparent from the following specification and claims.

According to the present invention, it has been discovered that the odor and color characteristics of a technical phenoxy-aliphatic-monocarboxylic acid, whose phenyl ring may contain one substituent selected from the group consisting of bromine, chlorine, alkyl and aryl, may be improved by subjecting an aqueous dispersion, i. e. a suspension or a solution of an alkali metal salt of said technical acid at a pH of at least 11 to the action of an alkali metal hypochlorite. Following the treatment with the hypochlorite, the aqueous dispersion is freed of excess hypochlorite and thereafter acidified to precipitate the purified organic acid. The latter may be recovered and separated from water soluble impurities by filtration. The product obtained in such operation is much superior to the technical organic acids as regards odor and color.

The amount of hypochlorite employed in the treatment of the salts of the technical acids is preferably the minimum amount necessary to accomplish the desirable result. An excess of the hypochlorite is operable, but such excess must be decomposed prior to the precipitation of the purified acid. The required amount of hypochlorite varies with the particular acid and with the degree of purity of the acid under treatment. The hypochlorite is ordinarily employed in the form of an aqueous solution. In practice, good results have been obtained when employing an amount of hypochlorite equal to at least one per cent by weight of the technical organic acid. In practice, the hypochlorite solution is added portionwise with stirring to the organic acid salt dispersion until further additions accomplish no further clarification or decoloration.

For the successful practice of the method of the present invention, the hypochlorite treatment of the aqueous dispersion of the salt of the technical organic acid must be carried out at a pH of at least 11. In practice, such alkaline reaction is conveniently obtained by the addition of a small amount of potassium hydroxide, sodium hydroxide or other suitable alkaline agent to the aqueous dispersion of the salt of the technical acid. Treatment of the aqueous dispersion at a pH of at least 11 is critical for the accomplishment of the purification, since hypochlorite treatments carried out at a pH significantly less than 11 result in the chlorination of the technical acid. For example, treatment of the unsubstituted and monosubstituted phenoxy-aliphatic-monocarboxylic acids at a lower pH results in the formation of the monochloro- and dichlorophenoxy-aliphatic-monocarboxylic acids, and the monosubstituted monochlorophenoxy-aliphatic-monocarboxylic acids, respectively.

The desired action of the hypochlorite takes place smoothly at a temperature of from 25° to 100° C. or slightly higher. In carrying out the purification, operation at the boiling temperature of the aqueous dispersion and under reflux is sometimes convenient.

The rate at which the purification takes place has been found to vary directly with the temperature employed. In practice, the treatment is generally carried out over a period of from 0.25 to 3 hours. The preferred operation is carried out at a temperature of from 60° to 100° C., at which temperatures the addition of the hypochlorite is generally carried out in from about 5 to 30 minutes.

For the successful practice of the method of the present invention, any excess hypochlorite in the aqueous dispersion of the organic acid salt must be decomposed prior to the precipitation of the free organic acid. This decomposition may be brought about by the addition of a small amount of hydrogen peroxide ($H_2O_2$) to the mixture. The hydrogen peroxide is conveniently employed in the form of an aqueous solution. Precipitation of the acid from a dispersion having a positive titer for the hypochlorite may result in a product of undesirable odor and color.

Following the decomposition of excess hypochlorite, the hypochlorite-free dispersion is acidified at a pH of at least 0.5 or higher, and preferably between a pH of 0.5 and a pH of 1.5, with a sufficient amount of a strong mineral acid, and preferably hydrochloric acid, to liberate the organic acid. Such acidification is conveniently carried out by simultaneously and separately metering the aqueous dispersion of the organic salt and the hydrochloric acid into an acidification vessel with stirring and at such rate that the pH of the mixture in the acidification vessel is always at least 0.5. The latter limitation is critical, since the precipitation of the acid at a pH less than 0.5 results in the recovery of a product of undesired color.

In an alternate method, the acidification may be carried out by adding the organic salt dispersion portionwise to an aqueous solution of hydrochloric acid of a pH of at least 0.5.

In carrying out the method of the present invention, an aqueous dispersion of the alkali metal salt of the technical organic acid is adjusted to a pH of at least 11, with an alkaline agent such as sodium hydroxide or potassium hydroxide and an aqueous solution of the alkali metal hypochlorite added portionwise thereto until no further perceptible change in color of the organic salt dispersion takes place. The addition is carried out with stirring and at a temperature of from 25° to 100° C. Following the hypochlorite treatment, the excess hypochlorite is decomposed by the addition of a small amount of aqueous hydrogen peroxide as previously described. The hypochlorite free product is then acidified to liberate the organic acid. The latter may be filtered to separate the desired purified product.

The following examples illustrate the invention but are not to be construed as limiting the same:

Example 1

70 grams of a gray-pink colored technical phenoxyacetic acid (M. P. 98.0°–100.2° C.) of high phenolic odor was dispersed in 400 milliliters of water, and an aqueous solution containing 50 per cent by weight of sodium hydroxide added portionwise thereto with stirring until the pH of the resulting solution of the salt of the technical acid at 37° C. was 12. An aqueous solution containing 14.5 per cent by weight of sodium hypochlorite was then slowly added portionwise to the above solution until no further perceptible change in color took place with the introduction of additional hypochlorite. The treatment was carried out at 37° C., and required the employment of 5 milliliters of the hypochlorite solution, which was added to the salt solution over a period of 6 minutes. Following the addition, the mixture was maintained at a temperature of 37° C. for about 2 hours. At the end of the heating period, the excess hypochlorite in the mixture was decomposed by the addition of 0.5 milliliter of aqueous 30 per cent hydrogen peroxide. The hypochlorite-free product was then acidified at a pH greater than 0.5, with a sufficient quantity of hydrochloric acid to liberate the phenoxyacetic acid. The acidified mixture was then cooled to 15° C. and filtered to separate as a residue phenoxyacetic acid as white crystals free of undesirable phenolic odor. This product was washed with water and dried. The melting point of the dried product was 98.6°–101.0° C.

Example 2

7.6 grams of the same technical phenoxyacetic acid as described in Example 1 was dispersed in 300 milliliters of water, and a sufficient amount of aqueous 50 per cent sodium hydroxide added portionwise thereto with stirring, that the pH of the resulting solution was 12.0. 50 milliliters of an aqueous solution containing 15 per cent by weight of sodium hypochlorite was then added portionwise to the above mixture at 25° C. with stirring. This quantity of hypochlorite was much in excess of the amount required for the clarification or decoloration of the salt solution. Following the hypochlorite addition, the mixture was maintained at a temperature of 25° C. for about 1.75 hours. At the end of this period, the excess hypochlorite in the mixture was decomposed by the addition of about 9 milliliters of aqueous 30 per cent hydrogen peroxide. The hypochlorite-free product was then acidified at a pH greater than 0.5, with a sufficient quantity of hydrochloric acid to liberate the phenoxyacetic acid. The acidified mixture was cooled to 10° C. and filtered to separate as a residue phenoxyacetic acid as white crystals free of any undesirable phenolic odor. This product was then dried and found to melt at 98.6°–99.8° C.

Example 3

76 grams of the same technical phenoxyacetic acid, as described in Example 1, was dispersed in 750 milliliters of water, and an aqueous 50 per cent sodium hydroxide solution added portionwise thereto with stirring, until the pH of the resulting solution when heated to the boiling temperature was 11.6. An aqueous solution containing 15 per cent by weight of sodium hypochlorite was slowly added portionwise to the above mixture with stirring until no further perceptible change in color took place. The addition was carried out at the boiling temperature and under reflux, and required the employment of 10 milliliters of the hypochlorite solution. Following the purification, the excess hypochlorite in the mixture was decomposed, and the resulting mixture treated as described in Example 1 to separate phenoxyacetic acid as a white crystalline solid which was substantially free of undesirable phenolic odor. The latter product had a melting point of 98.5°–101.0° C.

Example 4

50 grams of a gray-pink colored technical phenoxyacetic acid of high phenolic odor was dispersed in 150 milliliters of water and the resulting mixture neutralized with an excess of aqueous 50 per cent sodium hydroxide to prepare an aqueous slurry of sodium phenoxyacetate. The pH of the latter slurry when heated to 60° C. was 12.2. 10 milliliters of aqueous 15 per cent sodium hypochlorite was added to the slurry at 60° C. with stirring. The hypochlorite treated slurry was then maintained at a temperature of 60° C. for about 4 hours and thereafter treated as previously described to separate white crystalline phenoxyacetic acid free of undesirable phenolic odor. The latter product had a melting point of 98.6°–99.6° C. as compared to a melting point of 98.2°–99.3° C. for the original technical acid.

Example 5

444 pounds of a gray-pink colored technical phenoxyacetic acid of high phenolic odor was dispersed in 282 gallons of water, and an aqueous solution containing 50 per cent by weight of sodium hydroxide added portionwise thereto with stirring, until the pH of the resulting solution at 65° C. was 11.7. An aqueous solution containing from 13 to 15 per cent by weight of sodium hypochlorite was slowly added portionwise to the above mixture at 65° C. until no further perceptible change in color took place. The treatment required the employment of 40 pounds of the hypochlorite solution which was added to the salt solution over a period of about ¾ hour. Following the purification, the excess hypochlorite in the mixture was decomposed, and the resulting mixture treated in the usual manner to separate white crystalline phenoxyacetic acid free of undesirable phenolic odor. The latter product was found to have a freezing point of 98.4° C. as compared to a freezing point of 98.1° C. for the original technical material.

Example 6

18.6 grams of a pink colored technical 2-chlorophenoxyacetic acid (M. P. 145°–146.6° C.) of high phenolic odor was dispersed in 250 milliliters of water, and an aqueous solution containing 50 per cent by weight of sodium hydroxide added portionwise thereto with stirring, until the pH of the resulting solution at 65° C. was 11.5. An aqueous solution containing 15 per cent by weight of sodium hypochlorite was then slowly added portionwise to the above mixture at 65° C. with stirring, until no further perceptible change in color took place with the introduction of additional hypochlorite. The treatment required the employment of 5 milliliters of the hypochlorite solution. Following the hypochlorite addition, heating was continued for about 3 hours at 65° C. At the end of this period, the excess hypochlorite was decomposed and the hypochlorite free product treated in the usual fashion to obtain white crystalline 2-chlorophenoxyacetic acid of much improved odor and melting at 145°–146.6° C.

Example 7

18.5 grams of a gray colored technical 4-chlorophenoxy-acetic acid (M. P. 156.4°–158.1° C.) of high phenolic odor was dispersed in 250 milliliters of water, and a sufficient amount of aqueous 50 per cent sodium hydroxide added portionwise thereto with stirring, that the pH of the resulting solution at 65° C. was 11.8. An aqueous solution containing 15 per cent by weight of sodium hypochlorite was slowly added portionwise to the above mixture at 65° C. until no further perceptible change in color took place. The hypochlorite treatment was carried out with stirring and required the employment of 5 milliliters of the hypochlorite solution. Following the hypochlorite purification, the excess hypochlorite was decomposed by the addition of 0.5 millimeter of aqueous 30 per cent hydrogen peroxide, and the hypochlorite-free product treated as previously described to separate a white crystalline 4-chlorophenoxyacetic acid, which was substantially free of undesirable phenolic odor. The latter product had a melting point of 158.0°–159.1° C.

Example 8

33.2 grams of a light brown colored technical α-phenoxy-propionic acid (M. P. 113.8°–116.6° C.) was dispersed in 300 milliliters of water, and a sufficient amount of 50 per cent aqueous sodium hydroxide added portionwise thereto with stirring, that the pH of the resulting solution at 65° C. was 11.5. A 15 per cent aqueous solution of sodium hypochlorite was added portionwise to the above mixture at 65° C. until no further perceptible change in color took place. The hypochlorite treatment was carried out with stirring and required the employment of 10 milliliters of the hypochlorite solution. Following the purification, the excess hypochlorite was decomposed and the hypochlorite-free product treated in the usual manner to separate white crystalline α-phenoxypropionic acid. The melting point of the latter purified acid was identical with that of the original technical material.

Example 9

30 grams of pink colored 2-methylphenoxyacetic acid (M. P. 153°–154.6° C.) of undesirable phenolic odor was dispersed in 200 milliliters of water, and an aqueous solution containing 20 per cent by weight of potassium hydroxide added portionwise thereto with stirring until the pH of the resulting solution at 65° C. was 12.2. An aqueous solution containing 4.36 per cent by weight of potassium hypochlorite was added portionwise to the above mixture at 65° C., until no further perceptible change in color took place. The hypochlorite treatment required the employment of 30 milliliters of the hypochlorite solution which was added to the salt solution over a period of 15 minutes. Following the addition, the mixture was maintained at a temperature of 65° C. for about 1¼ hours. The salt solution was then treated as previously described to separate 2-methylphenoxyacetic acid as white crystals free of undesirable phenolic odor. The melting point of the latter purified acid was identical with that of the original technical material.

Example 10

30 grams of the same technical 2-methylphenoxyacetic acid, as described in Example 9, was dispersed in 200 milliliters of water, and an aqueous solution containing 20 per cent by weight of potassium hydroxide added portionwise thereto with stirring until the pH of the resulting solution at 65° C. was 12.3. 50 milliliters of an aqueous solution containing 15 per cent by weight of sodium hypochlorite was then added portionwise to the above mixture over a period of 14 minutes. The addition was carried out with stirring and at a temperature of 65° C. The quantity of hypochlorite employed was in excess of the amount required for the clarification or decoloration of the salt solution. Following the hypochlorite addition, the salt solution was maintained at a temperature of 65° C. for about 30 minutes. The mixture was then treated in the usual manner to separate 2-methylphenoxyacetic acid as white crystals free of undesirable phenolic odor. The latter purified acid had a melting point of 152.8–154.6° C.

*Example 11*

30 grams of a gray colored technical 4-bromophenoxyacetic acid of undesirable odor was dispersed in 200 milliliters of water, and an aqueous solution containing 50 per cent by weight of sodium hydroxide added portionwise thereto with stirring, until the pH of the resulting solution at 65° C. was 11.7. An aqueous solution containing 15 per cent by weight of sodium hypochlorite was then added portionwise to the above mixture at 65° C. This amount of hypochlorite was much in excess of the amount required for the decoloration or clarification of the salt solution. Following the hypochlorite addition, the mixture was maintained at a temperature of 65° C. for about 30 minutes and thereafter treated in the usual fashion to separate white crystalline 4-bromophenoxyacetic acid free of undesirable phenolic odor. This purified acid had a melting point of 159.6°–160° C. as compared to a melting point of 158.2°–159.6° C. for the original technical material.

*Example 12*

20 grams of a brown colored technical 2-phenylphenoxyacetic acid of undesirable odor was dispersed in 100 milliliters of water, and an aqueous solution containing 50 per cent by weight of potassium hydroxide added portionwise thereto, until the pH of the resulting solution at 60° C. was 12.8. 80 milliliters of an aqueous solution containing 15 per cent by weight of sodium hypochlorite was then added portionwise to the above mixture at from 60° to 70° C. with stirring. This quantity of hypochlorite was much in excess of the amount required for the decoloration or clarification of the salt solution. Following the hypochlorite addition, the mixture was maintained at about 70° C. for about 4 hours. At the end of this period, the mixture was treated in the usual fashion to separate a substantially white crystalline 2-phenylphenoxyacetic acid of much improved odor. The latter product had a melting point of 107.2°–109° C. as compared to a melting point of 107.9°–108.8° C. for the original technical acid.

Indicative of the criticalness of the limitation of the pH to 11 or higher for the hypochlorite treatment of the aqueous dispersion of the salts of the technical organic acids, is the fact that the acids undergo chlorination at lower pH values as evidenced by the following.

7.6 grams of the technical phenoxyacetic acid, as employed in Example 1, was dispersed in 300 milliliters of water, and a sufficient amount of aqueous 50 per cent sodium hydroxide added portionwise thereto with stirring, that the pH of the resulting solution was 8.0. 100 milliliters of an aqueous solution containing 15 per cent by weight of sodium hypochorite was added portionwise over a period of 17 minutes to the foregoing mixture at 25° C. During the hypochlorite addition, the mixture was maintained at a pH of about 8.0 by the addition of small quantities of 0.1 normal hydrochloric acid. Following the hypochlorite addition, the mixture was maintained at a temperature of 25° C. for 4.5 hours. During this period, the hypochlorite titer of the mixture decreased rapidly and the addition of small amounts of 0.1 normal sodium hydroxide was required to keep the mixture at a pH of about 8.0. At the end of the heating period, the remaining hypochlorite was decomposed by the addition of 1.0 milliliter of aqueous 30 per cent hydrogen peroxide, and the resulting mixture treated as described in Example 1 to separate a white crystalline product. The latter product had a melting range of 121° to 144° C.

In a further operation, 30 grams of the technical 4-bromophenoxyacetic acid, described in Example 11, was dispersed in 350 milliliters of water, and an aqueous solution containing 50 per cent by weight of sodium hydroxide added portionwise thereto with stirring, until the pH of the resulting solution at 65° C. was 8.8. 50 milliliters of an aqueous solution containing 15 per cent by weight of sodium hypochlorite was added portionwise to the above solution over a period of 8 minutes. The addition was carried out with stirring and at a temperature of 65° C. During the hypochlorite addition, the mixture was maintained at a pH of from 7.9 to 8.8 by the addition of small amounts of dilute aqueous hydrochloric acid. Following the addition, the mixture was maintained at a temperature of 65° C. for about 30 minutes and then processed in the usual manner to separate white crystalline 4-bromophenoxyacetic acid product having a melting range of from 133.0°–154.5° C.

We claim:

1. A method for the purification of a technical phenoxy-aliphatic-monocarboxylic acid, whose phenyl ring may contain a single substituent selected from the group consisting of bromine, chlorine, alkyl and aryl, which comprises the steps of (1) contacting an aqueous dispersion of an alkali metal salt of said technical acid at a pH of at least 11, with an alkali metal hypochlorite, (2) decomposing any excess hypochlorite in the mixture and (3) acidifying the mixture to precipitate the purified organic acid.

2. A method for the purification of a technical phenoxy-aliphatic-monocarboxylic acid, whose phenyl ring may contain a single substituent selected from the group consisting of bromine, chlorine, alkyl and aryl, which comprises the steps of (1) mixing together in aqueous dispersion and at a pH of at least 11 (a) an alkali metal salt of said technical acid and (b) an alkali metal hypochlorite in the amount of at least one per cent by weight of the technical acid, (2) decomposing any excess hypochlorite in the mixture, and (3) acidifying the mixture to precipitate the purified organic acid, the hydrogen ion concentration of the aqueous mixture being maintained at a pH of at least 0.5 throughout the precipitation.

3. A method for the purification of a technical phenoxy-aliphatic-monocarboxylic acid, whose phenyl ring may contain a single substituent selected from the group consisting of bromine, chlorine, alkyl and aryl, which comprises the steps of (1) contacting an aqueous dispersion of an alkali metal salt of said technical acid at a pH of at least 11, with an alkali metal hypochlorite, (2) decomposing any excess hypochlorite in the mixture, (3) acidifying the mixture to precipitate the organic acid and (4) filtering the mixture to recover the purified organic acid.

4. A method for the purification of a technical phenoxy-aliphatic-monocarboxylic acid which comprises the steps of (1) mixing together in aqueous dispersion and at a pH of at least 11 (a) the sodium salt of said technical acid and (b) sodium hypochlorite in the amount of at least one per cent by weight of the technical acid, (2) decomposing any excess hypochlorite in the mixture and (3) acidifying the mixture to precipitate the purified organic acid, the hydrogen ion concentration in the mixture being maintained at a pH of at least 0.5 throughout the precipitation.

5. The method claimed in claim 2, wherein the technical acid is phenoxyacetic acid.

6. The method claimed in claim 2, wherein the technical acid is 4-chlorophenoxyacetic acid.

7. The method claimed in claim 2, wherein the technical acid is 2-methylphenoxyacetic acid.

8. The method claimed in claim 2, wherein the technical acid is 2-chlorophenoxyacetic acid.

9. The method claimed in claim 2, wherein the technical acid is $\alpha$(2-chlorophenoxy)propionic acid.

ROBERT C. DOSSER.
AMERST E. COLBY.

REFERENCES CITED

The following references are of record in the file of this patent:

UNITED STATES PATENTS

| Number | Name | Date |
|---|---|---|
| 2,083,856 | Moravec et al. | June 15, 1937 |